United States Patent [19]

Agazzi

[11] Patent Number: 4,999,830
[45] Date of Patent: Mar. 12, 1991

[54] COMMUNICATION SYSTEM ANALOG-TO-DIGITAL CONVERTER USING ECHO INFORMATION TO IMPROVE RESOLUTION

[75] Inventor: Oscar E. Agazzi, Scotch Plains, N.J.

[73] Assignee: AT&T Bell Laboratories, Murray Hill, N.J.

[21] Appl. No.: 412,257

[22] Filed: Sep. 25, 1989

[51] Int. Cl.$^5$ ............................................... H04J 1/00
[52] U.S. Cl. .................................... 370/32.1; 379/406
[58] Field of Search ................. 370/32.1, 32; 379/406, 379/410, 411

[56] References Cited

U.S. PATENT DOCUMENTS 4,612,533  9/1986  Evans .
4,746,902  5/1988  Tol et al. .

OTHER PUBLICATIONS

*IEEE Transactions on Communications*, vol. COM-30, No. 9, Sep. 1982, "Large Scale Integration of Hybrid-Method Digital Subscriber Loops", by Oscar Agazzi, David A. Hodges and David G. Messerschmitt, pp. 2095–2108.
*Proceedings of the 1988 IEEE Custom Integrated Circuits Conference*, Rochester, N.Y., May 1988, "A 13 Bit 160 KHz Sigma-Delta A/D Converter for ISDN", by S. R. Norsworthy and I. G. Post, pp. 21.3.1–21.3.4.
*IEEE Transactions on Acoustics, Speech and Signal Processing*, vol. ASSP-22, No. 6, Dec. 1974, "A New Hardware Realization of Digital Filters", by A. Peled and B. Liu, pp. 456–462.

Primary Examiner—James L. Dwyer
Assistant Examiner—M. Shehata
Attorney, Agent, or Firm—L. H. Birnbaum

[57] ABSTRACT

A communication system for exchanging digital signals over a transmission link has at least one terminal that simultaneously applies an analog signal corresponding to a first digital stream to the link and converts an analog signal from the link into a second digital stream. The analog signal received from the link has a near end echo component related to the first digital stream. The second digital stream formation includes generating an m<n bit digital signal corresponding to the echo component of the received analog signal from the input digital stream, forming an analog signal representing the difference between the received analog signal and the predetermined component m bit digital signal, converting the difference representative analog signal to an n-m bit digital signal, and combining the m bit digital signal corresponding to the predetermined component with the n-m bit digital signal corresponding to the difference representative signal to produce an n bit digital signal representing the received analog signal.

10 Claims, 6 Drawing Sheets

COMMUNICATION SYSTEM ANALOG-TO-DIGITAL CONVERTER USING ECHO INFORMATION TO IMPROVE RESOLUTION

FIELD OF THE INVENTION

The invention relates to communication systems and more particularly to arrangements for converting analog signals into digital signals in communication systems.

BACKGROUND OF THE INVENTION

In communication systems such as the Integrated Services Digital Network (ISDN) basic access, the digital information is exchanged between terminals in analog form over a two-wire transmission path. Each terminal includes an ISDN basic access transceiver adapted to transmit a digital stream coded in analog form and to convert a received analog signal to a digital stream. While the received signal is analog, the ISDN basic access receiver processing is generally performed digitally to take advantage of the better precision, lower noise and the large scale integration economy of digital processing. It is therefore necessary to convert an incoming analog signal at the receiver to digital form preparatory to the digital processing. The analog-to-digital conversion preceding the digital processing must be very precise to avoid severe distortion. Such precision may be obtained by using large high resolution converters with compensation networks, component trimming or oversampling of signals.

U.S. Pat. No. 4,746,902 issued to Tol et al, May 24, 1988, discloses an arrangement that compensates for nonlinear distortion in an input signal to be digitized having an analog-to-digital converter that converts the input signal into an amplitude-time discrete output signal. Processing apparatus derives a set of coefficients associated with an orthogonal signal representation of a signal related to the input signal. A table storing correction values is addressed by a signal derived from the set of coefficients to produce a correction value. The correction value and the analog-to-digital converter output signal are summed to provide a linearized signal and an adaptive control loop substitutes a new correction value for the correction value read from the table. While the arrangement corrects for distortion generated by the analog-to-digital converter, it has limited application and does not improve the resolution of the converter or reduce its complexity or size.

U.S. Pat. No. 4,612,533 issued to Evans, Sept. 16, 1986, describes a harmonic distortion reduction technique for data acquisition to provide fast conversion rates in which a subrange digital-to-analog converter (DAC) is augmented with a software calibrated DAC to remove system nonlinearities. Harmonic distortion is reduced by adding a correction to the input of the subrange ADC or by using a look up table at the output of the ADC. While the harmonic distortion reduction is achieved, it requires both a main ADC and a subrange DAC converter. The resulting arrangement, however, is highly dependent on analog components and analog processing and is relatively slow since it is necessary to delay the operation of the subrange DAC until each cycle of operation of the main ADC is completed.

In transmission systems where transceivers are employed for full duplex operation, a large component of the received signal is an echo of the signal being transmitted. The echo due to the transmitted signal and other components of the received signal may be synthesized from the information being processed for transmission and other sources. The aforementioned arrangements provide conversion of an unknown analog signal into a high resolution digital form without utilizing such previously known characteristics. It is an object of the invention to provide improved resolution analog-to-digital conversion in communication systems for signals having known or synthesizable components.

BRIEF SUMMARY OF THE INVENTION

The invention is directed to a communication system for exchanging digital signals over a transmission link between terminals. Each terminal converts a first digital stream to be sent to another terminal into an analog signal which is applied to the transmission link. The analog signal received from the transmission link includes a predetermined component corresponding to the first digital stream. A second digital stream is formed from the received analog signal. The second digital stream formation includes generating an $m<n$ bit digital signal corresponding to the predetermined component of the received analog signal from the first digital signals, forming an analog signal representative of the difference between the received analog signal and the predetermined component m bit digital signal, converting the difference representative analog signal to an n-m bit digital signal, and combining the m bit digital signal corresponding to the predetermined component with the n-m bit digital signal corresponding to the difference representative signal to produce an n bit digital signal representing the received analog signal.

DETAILED DESCRIPTION

Figure 1:
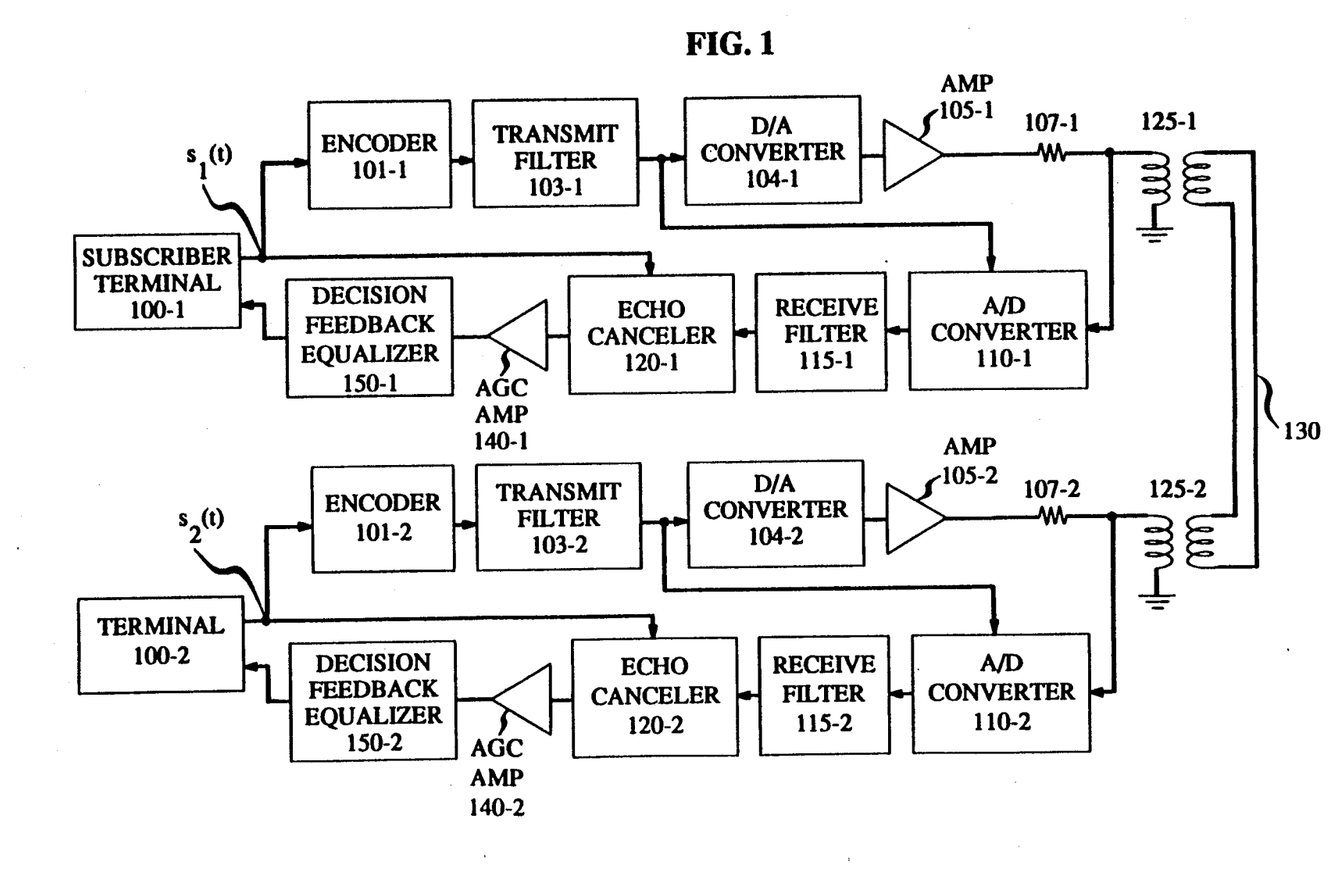
FIG. 1 depicts a general block diagram of a communication system using a pair of ISDN basic access transceivers illustrative of the invention.

FIG. 1 illustrates a baseband arrangement for simultaneous bidirectional transmission of digital streams over a single two-wire transmission line. In FIG. 1, a digital symbol sequence signal $s_1(t)$ is sent from subscriber terminal 100-1 to terminal 100-2 via a two-wire transmission line 130. Terminal 100-2 may, for example, be at the central office end of a subscriber loop or may be another subscriber terminal. Another digital symbol sequence signal $s_2(t)$ may be sent simultaneously from terminal 100-2 over the same transmission line. Signals $s_1(t)$ and $s_2(t)$ can represent data, speech, image or other information that is in digital form.

Signal $s_1(t)$ is applied to encoder 101-1 which produces coded symbols corresponding to a multilevel code representation of the input digital signal. For example, the two digital streams illustrated in waveforms 501 and 502 of FIG. 5 may be encoded to correspond to the four level 2B1Q coded signal shown in waveform 505. In waveform 505, the signal has four levels: −3, −1, +1 and +3. The level of the 2B1Q signal is determined by the present states of waveforms 501 and 502. Waveform 501 corresponds to the sign bit of the 2B1Q code and waveform 502 corresponds to the magnitude bit of the code. If the sign bit is high while the magnitude bit is low as between $t_0$ and $t_1$, the 2B1Q symbol is +3 as shown in waveform 505. Where the sign bit is low and the magnitude bit is high as between $t_1$ and $t_2$, the 2B1Q symbol is −1. A high sign bit and a high magnitude bit as between times $t_3$ and $t_4$ results in a +1 symbol and a low sign bit with a low magnitude bit yields a −3 symbol as between times $t_7$ and $t_8$.

Figure 5:
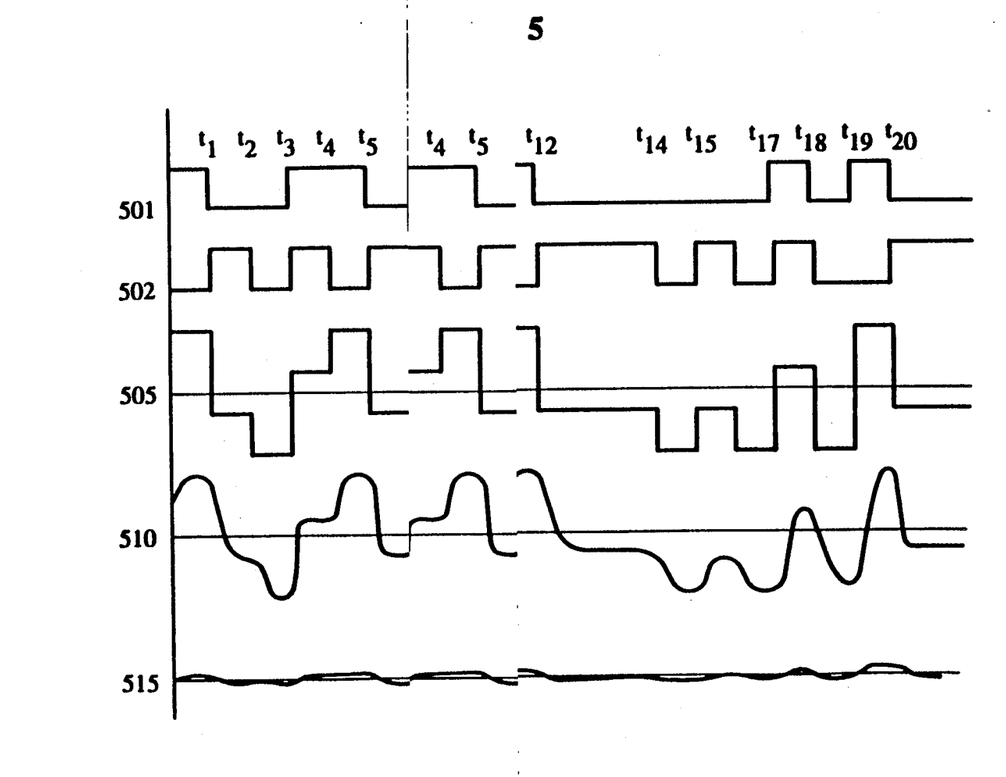
FIG. 5 shows waveforms illustrating the operation of the transceiver arrangement of FIG. 1.

The digital codes from encoder 101-1 representing the 2B1Q four level code shown in waveform 505 are applied to digital transmit filter 103-1. The transmit filter reshapes the input from encoder 101-1 to remove high frequency components that would cause unnecessary disturbances on transmission line 130. Digital-to-analog converter 104-1 provides an analog signal shown in waveform 510 which is the filtered four level signal applied via amplifier 105-1, matching impedance 107-1 and transformer 125-1 to the transmission line. The transmitted signal is illustrated in waveform 510 while waveform 515 illustrates the corresponding received signal after being attenuated and dispersed by the transmission path. The transmit filter is a digital version of the type described in the article "Large Scale Integration of Hybrid-Method Digital Subscriber Loops" by Oscar Agazzi, David A. Hodges and David G. Messerschmitt appearing in the *IEEE Transactions on Communications*, Vol. COM-30, No. 9, September 1982, pp. 2095–2108 which may be constructed by techniques well known in the art. Signal $s_2(t)$ is similarly applied to line 130 from terminal 100-2.

The signal received from line 130 by transformer 125-1 comprises a far end component corresponding to the 2B1Q coded signal from terminal 100-2 as well as a near end echo of the signal from amplifier 105-1 and intersymbol interference from the far end. In order to detect the signal received from station 100-2, the echo components corresponding to signal $s_1(t)$ must be substantially removed prior to applying the received signal to terminal 100-1. The received signal on transformer 125-1 is sampled at a prescribed rate, e.g., 160 KHz, and converted into successive digital values by analog-to-digital converter 110-1. The output of the A/D converter is modified in receive filter 115-1 and applied to one input of echo canceler 120-1. The receive filter is of the type described in the aforementioned article "Large Scale Integration of Hybrid-Method Digital Subscriber Loops" by Oscar Agazzi, David A. Hodges and David G. Messerschmitt. It is designed to remove unwanted spectral portions from the received signal. A replica of the echo is formed in canceler 120-1 from the successive symbols generated in terminal 100-1. As is well known in the art, the echo canceler uses the symbol sequence being transmitted to generate an echo replica. This echo replica is subtracted from the signal received from line 130 to remove the near end echo component therein.

Echo canceler 120-1 is a digital type nonlinear canceler. Consequently, the received analog signal applied thereto from A/D converter 110-1 must be accurately converted into an n bit digital representation of the signal applied thereto from transformer 125-1. The near end echo in analog signal from transformer 125-1, however, constitutes the major component of this analog signal and is generally much larger than the far end signal. In accordance with the invention, the information available in the digital stream at transmit filter 103-1 is used to form a coarse m < n bit version of the near end echo component in the signal at transformer 125-1. The coarse m bit version permits an n-m bit converter to be used for digital-to-analog conversion rather than an n bit converter previously required. Advantageously, the use of lower precision m bit D/A converter and lower precision n-m bit A/D converter permits an improvement in the resolution that can be achieved in the transceiver. m and n may be 5 and 18, respectively.

Figure 2:
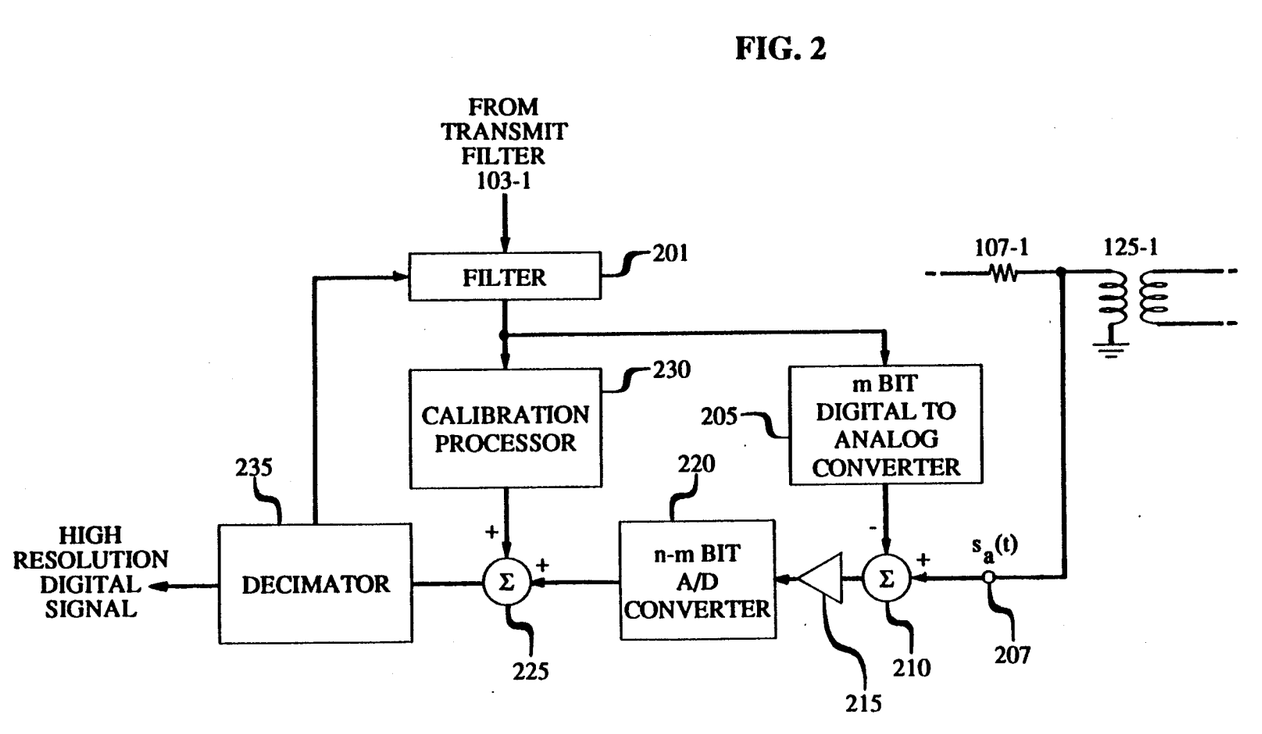
FIG. 2 depicts a more detailed block diagram of an analog-to-digital converter that may be used in each transceiver of FIG. 1.

FIG. 2 shows analog-to-digital converter 110-1 of FIG. 1 which is adapted to convert the analog signal from transformer 125-1 into a sequence of digital samples $s_1, s_2, \ldots s_r \ldots$ with the prescribed resolution of n bits required by canceler 120-1. Referring to FIG. 2, filter 201 operates to convert the digital signal from transmit filter 103-1 into an m bit digital signal corresponding to the near end echo component of the analog signal $s_a(t)$ appearing at point 207. Digital-to-analog converter 205 transforms the m bit digital signal from filter 201 into an analog signal $s_{kc}(t)$ that approximates the near end echo component in signal $s_a(t)$. Advantageously, m may be chosen so that the analog signal therefrom is a relatively coarse approximation to signal $s_{kc}(t)$. Signals $s_a(t)$ and $s_{kc}(t)$ are combined in summing circuit 210 to form a difference signal $$s_{diff}(t) = s_a(t) - s_{kc}(t). \tag{1}$$

The difference signal $s_{diff}(t)$ is amplified in amplifier 215 and the amplified difference signal is transformed into an n-m bit digital signal by A/D converter 220. Where analog-to-digital converter 220 is of the sigma-delta modulator type of the general type described in the article "A 13 Bit 160 KHz Sigma-Delta A/D Converter for ISDN" by S. R. Norsworthy and I. G. Post appearing in the *Proceedings of the 1988 IEEE Custom Integrated Circuits Conference*, Rochester, N.Y., May 1988, pp. 21.3.1–21.3.4. Filter 201 includes an interpolator to increase the sampling rate of its output signal. Interpolation makes the filter output compatible with the sigma-delta converter. Decimator 235 is used to reduce the sampling rate of the output of digital summing circuit 225 for compatibility with echo canceler 120-1. It also low pass filters the signal applied thereto and reduces quantizing noise.

As aforementioned, filter 201 receives the output of transmit filter 103-1 and forms an m bit digital signal representing the near end echo component of the signal $s_a(t)$. This m bit digital signal is applied through calibration processor 230 to one input of digital summing circuit 225. The n-m bit difference signal output of A/D converter 220 is applied to the other input of digital summing circuit 225. As a result, summing circuit 225 generates an n bit digital signal corresponding to signal $s_a(t)$. In accordance with the invention, the information causing the near end echo component is converted into a coarse approximation of the near end echo which reduces the magnitude of the signal applied to analog-to-digital converter 220. By amplifying the difference signal, a relatively low resolution analog-to-digital conversion may be used to obtain a high resolution digital signal representing incoming signal s(t).

Figure 6:
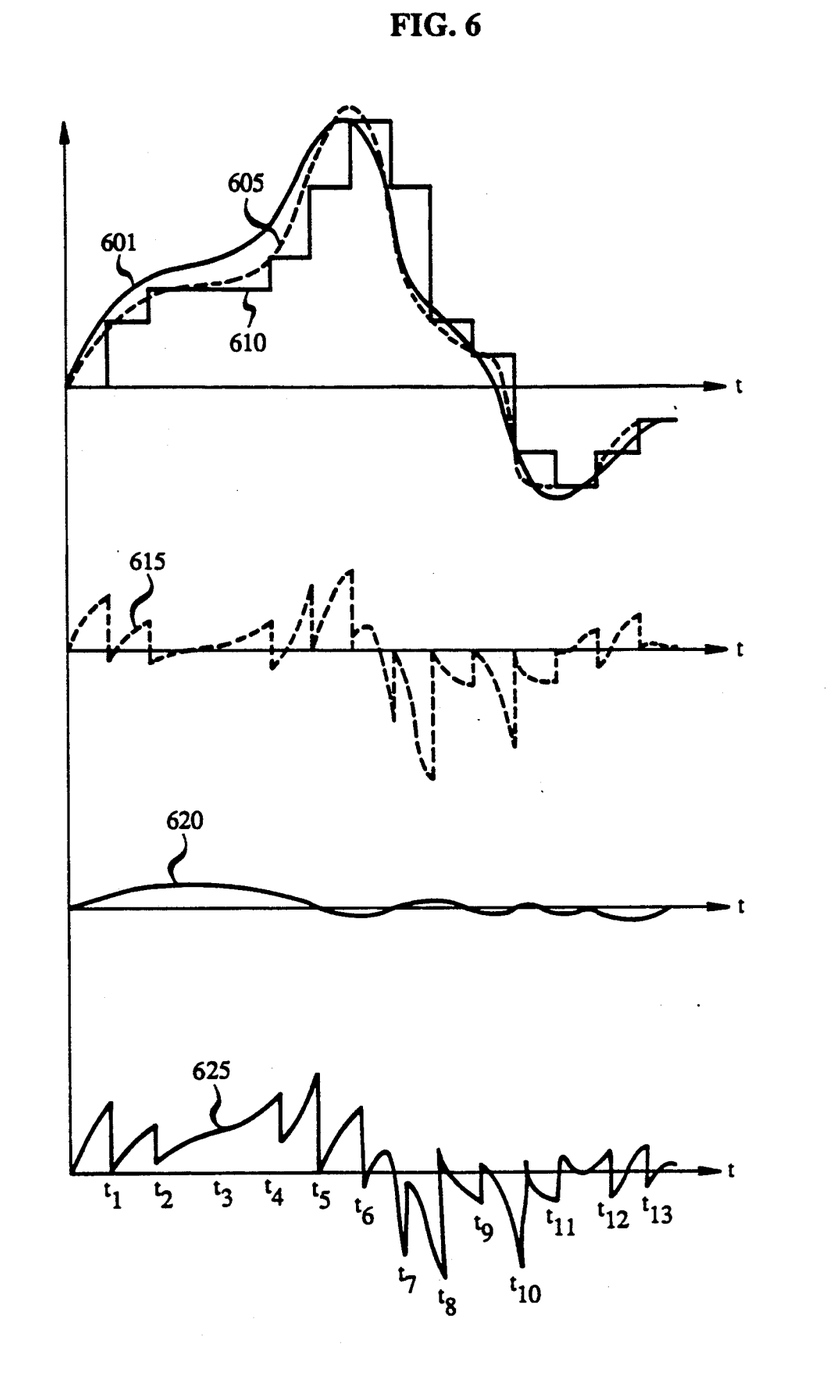
FIG. 6 shows waveforms illustrating the operation of the circuit of FIG. 2.

FIG. 6 shows waveforms illustrative of the operation of FIG. 2. Referring to FIGS. 2 and 6, the signal at point 207 (waveform 601) represents the received signal $s_a(t)$ including the near end echo component. Waveform 605 conceptually illustrates the near end component of signal $s_a(t)$ but does not actually appear in the circuit. Waveform 610 is the coarse quantized approximation of the near end component produced by the combination of filter 201 and digital-to-analog converter 205 in response to the signal from transmit filter 103-1. The difference between the signals of waveforms 601 and 605 is shown in waveform 620 and the quantizing noise at the output of digital-to-analog converter is shown in waveform 615. Waveform 625 is the sum of waveforms 615 and 620 and represents the signal $s_{diff}(t)$ at the input of A/D converter 220. As is evident from waveform 625, the near end echo is the major component of signal $s_a(t)$. Subtracting the output of converter 205 from signal $s_a(t)$ provides a relatively small signal so that conversion of the amplified version results in an accurate n-m bit digital signal. Errors introduced by the coarse quantization of the near end echo formed in filter 201 as well as converter 205 and component variations are removed in digital summing circuit 225.

Figure 3:
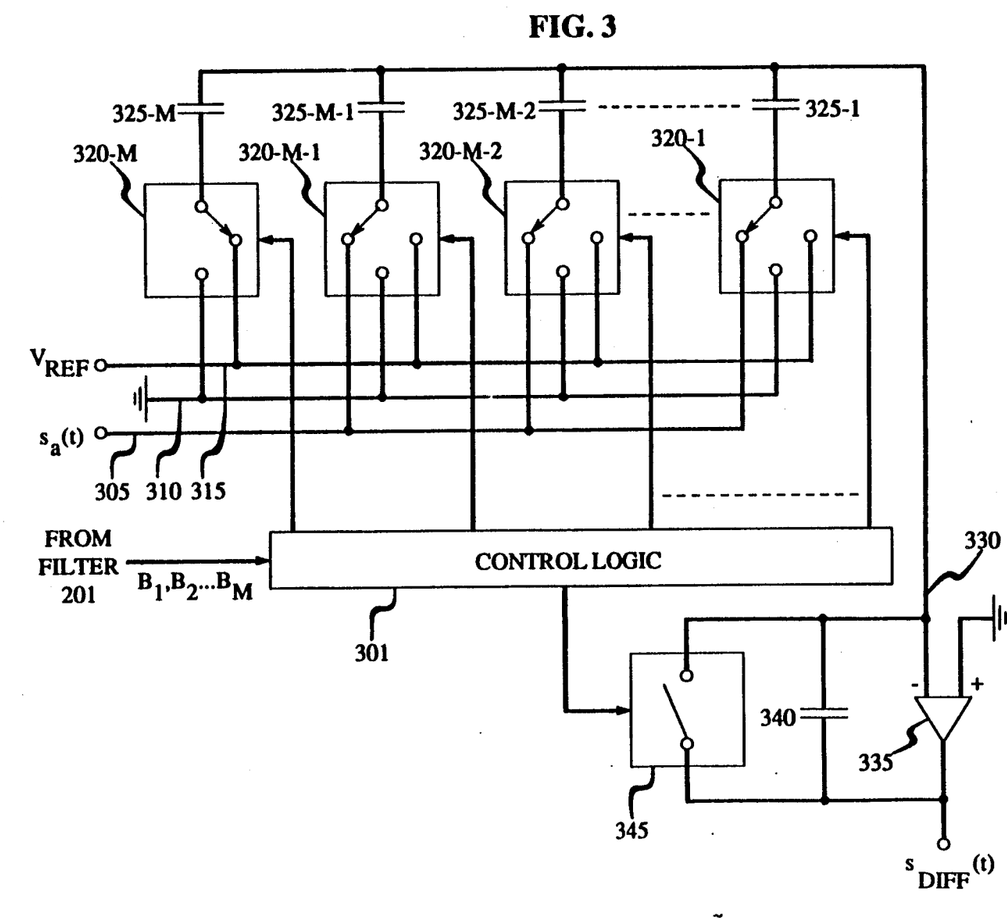
FIG. 3 shows a circuit diagram of a digital-to-analog converter and summing circuit that may be used in the circuit of FIG. 2.

The circuit of FIG. 3 shows a possible implementation of digital-to-analog converter 205 and summing circuit 210 of FIG. 2 in greater detail. The circuit of FIG. 3 is designed to be connected to any type of analog-to-digital converter. In the event a sigma-delta modulator is not used, interpolation and decimation are not required. The arrangement of FIG. 3 includes switches 320-1 through 320-M, capacitors 325-1 through 325-M, operational amplifier 335, capacitor 340 and switch 345. Capacitors 325-1 through 325-M in cooperation with switches 320-1 through 320-M provide a charge redistribution type network controlled by control logic 301 to develop a charge corresponding to the difference between signal $s_a(t)$ and signal $s_{kc}(t)$. Amplifier 335 functions as amplifier 215 in FIG. 2. The charge obtained from the operation of the charge redistribution network in a first time interval is transferred via lead 330 to capacitor 340 in a second time interval. The values of capacitors 325-1 through 325-M are selected in ascending binary order. Capacitor 325-M corresponds to the most significant bit of the m bit signal from filter 201. Capacitor 325-M-1 is one-half the value of capacitor 325-M and capacitor 325-M-2 is one-fourth the value of capacitor 325-M. Capacitor 325-1 corresponds to the least significant bit of the filter output and is $\frac{1}{2}^M$ of the value of capacitor 325-M.

The circuit of FIG. 3 operates on each bit $B_k$ output of filter 201. In the initial portion of each sampling period, switch 345 is closed discharging capacitor 340. The upper plates of capacitors 325-1 through 325-M are connected to virtual ground through line 330, switch 345 and the ground at the positive input of amplifier 335. Switches 320-1 through 320-M-1 connect the lower plates of capacitors 325-1 through 325-M-1 to line 305 so that these capacitors are charged to the present value of incoming signal $s_a(t)$. Switch 320-M connects the lower plate capacitor 325-M to line 315 and it is charged to voltage $V_{ref}$. During the subsequent interval of the sampling period, switch 345 is opened. Switches 320-1 through 320-M are connected either to ground via line 310 or to voltage $V_{ref}$ via line 315 according to the state of the corresponding bit of the m bit signal from filter 201. If the most significant bit $B_M$ is a one, switch 320-M connects the lower plate of capacitor 325-M to ground. If the less significant bits $B_1$ through $B_{M-1}$ are ones, the lower plates of capacitors 325-1 through 325-M-1 are connected to line $V_{ref}$. The charges on capacitors 325-1 to 325-M are redistributed and transferred to capacitor 340. The output of integrating amplifier 335 is then $$S_{diff}(n) = s(n)\frac{C_T}{C_I} + \left(B_M\frac{C_M}{C_I}\right) \quad (2)$$

where $$C_T = \sum_{k=1}^{M-1} C_K$$

k is the bit position in the filter output sample, $C_M$ through $C_1$ correspond to capacitors 325-M through 325-1. $B_k$ is the state of the kth bit of the filter output. $C_k$ is the Mth bit position capacitor and $C_I$ is the value of integrator capacitor 340.

As aforementioned, analog-to-digital converter 220 may comprise a single ended sigma-delta modulator. A fully differential type may also be used. Amplifier 335 may be the input amplifier stage of the sigma-delta modulator where the input capacitor is replaced by capacitors 325-1 through 325-M and associated switches and controls. Integrator capacitor 340 is then the integrating capacitor of the first stage of the modulator rather than as shown in FIG. 3. In this way, digital-to-analog converter 205, analog summing circuit 210, amplifier 215 and analog-to-digital converter 220 may consist of the circuit of FIG. 3 and the remainder of the sigma-delta A/D modulator.

Calibration processor 230 in FIG. 2 is adapted to generate and store calibration signals $V_1, \ldots, V_M$ that compensate for variations in values of capacitors 325-1 through 325-M. Signals $V_1, \ldots, V_M$ obtained at the output of decimator 235 are stored in the calibration processor so that they may be added as correction signals to the m bit digital signal from filter 201. The calibration operations are performed under control of processor 230 when the circuit of FIG. 1 is turned on and may be repeated periodically during its operation.

During the calibration process, charge signals $$\begin{aligned} s_1 &= C_1 \, V_{ref} \\ s_2 &= (C_2 - C_1) \, V_{ref} \\ s_3 &= (C_3 - C_2 - C_1) \\ &\vdots \\ s_M &= (C_M - C_{M-1} - \ldots - C_1) \, V_{ref} \end{aligned} \quad (3)$$

where $C_1$ through $C_M$ are the capacitor values of capacitors 325-1 through 325-M are generated in the circuit of FIG. 3 and transferred to the integrator comprising operational amplifier 335 and capacitor 340. The charge signals are produced sequentially. In each sequential operation, there are two time intervals. In the first interval, line 330 is connected to virtual ground by closing switch 345. The lower plates of capacitors 325-1 through 325-M are connected either to voltage $V_{ref}$ on line 315 or to ground on line 310 via switches 320-1 through 320-M to charge in accordance with equation (3). In the second interval, switch 345 is opened. Switches 320-1 through 320-M are controlled by calibration processor 230 to connect the lower plates of capacitors 325-1 through 325-M to transfer charge in accordance with equation (3).

Charge signal $s_1$ is produced by connecting the lower plate of capacitor 325-1 to voltage source $V_{ref}$ during the first interval and to ground during the second interval. The lower plates of capacitors 325-2 through 325-M are connected to ground during the first and second intervals. To generate charge signal $s_2$, capacitor 325-1 is connected to ground through switch 320-1 while capacitor 325-2 is connected to $V_{ref}$ through switch 320-2 during the first interval. In the second interval, the lower plate of capacitor 325-1 is connected to $V_{ref}$ while the lower plate of capacitor 325-2 is connected to ground. Switches 320-3 through 320-M connect the lower plates of capacitors 325-3 through 325-M to ground during both the first and second intervals. Charge signals $s_3$ through $s_M$ are produced in similar manner.

As a result of charge signals $s_1, s_2, \ldots, s_M$, digital signals $V_1, V_2, \ldots, V_M$ appear at the output of decimator 235. These signals are measured by the calibration processor and are stored therein. Signals $V_1, V_2, \ldots, V_M$ carry information about the true values of capacitors 325-1 through 325-M as well as the gain of amplifier 335 and analog-to-digital converter 220. The actual values of capacitors modified by the gain errors of amplifier 335 and converter 220 are obtained by processing to solve the equations:

$$V_1 = C_{p1}$$
$$V_2 = C_{p2} - C_{p1}$$
$$V_3 = C_{p3} - C_{p2} - C_{p1}$$
$$V_M = C_{pM} - C_{pM-1} - \ldots - C_{p1}$$
(4)

and the true capacitor values normalized to the value $C_I$ of integrating capacitor 340 are $$C_{p1} = V_1$$
$$C_{p2} = V_2 + C_{p1}$$
$$C_{p3} = V_3 + C_{p2} + C_{p1}$$
$$C_{pM} = V_M + C_{pM-1} + \ldots + C_{p1}.$$
(5)

The values of equation (5) are used to modify the m bit digital signal from filter 201 to correct for variations of components in m bit digital-to-analog converter 205, analog summer 210, amplifier 215 and n-m bit analog to digital converter 220. There are $2^M$ possible values for the modified m bit digital signal. These values are stored in a random access memory of calibration processor 230. The correction values are addressed by the m bit digital signal from filter 201 and are added thereto prior to the summation in digital adder circuit 225.

Figure 4:
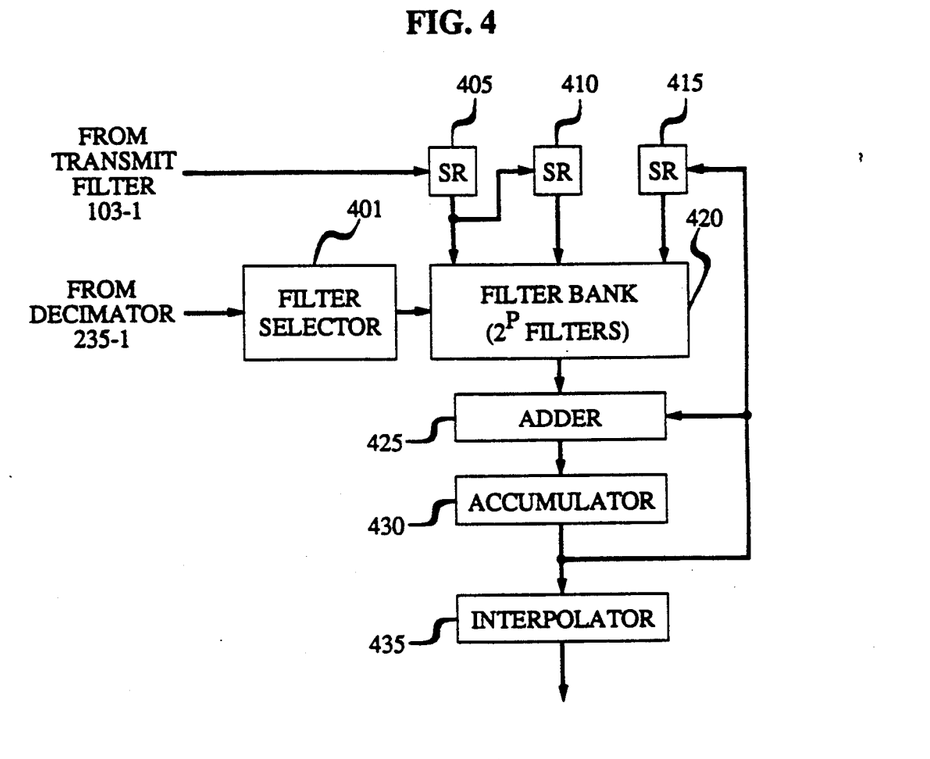
FIG. 4 shows a more detailed block diagram of a digital shaping filter that may be used in the circuit of FIG. 2.

Digital shaping filter 201 in FIG. 2 may be an adaptive filter or a programmable filter set to best represent the near end echo component appearing at point 207. FIG. 4 shows a programmable filter adapted for use as digital shaping filter 201 in greater detail. One type of filter that may be used is generally described in the article "A New Hardware Realization of Digital Filters" by A. Peled and B. Liu appearing in the *IEEE Transactions on Acoustics, Speech and Signals Processing*, Vol. ASSP-22, No. 6, December 1974, pp. 456–462. The programmable filter comprises a read only memory (ROM) 420 which is addressed from shift registers 405, 410 and 415 and filter selector 401. Shift registers 405 and 410 apply delayed samples of the bit stream from transmit filter 103-1 to the memory and shift register 415 supplies the previous filter output sample to memory 420. The structure shown in FIG. 4 corresponds to a filter with one pole and one zero. Filters implementing other zero and pole arrangements may also be used. Digital interpolator 435 increases the sampling rate of the filter output signal so that it may be applied to sigma-delta type analog-to-digital converter 220. Where m=5, transmit filter 103-1 may supply a 7 bit sample code to filter 201 so that accumulated truncation errors do not appear in the 5 bit output code applied to interpolator 435.

Memory 420 stores signals corresponding to the outputs of a plurality of filters. Filter selector 401 chooses the filter in ROM 401 that best matches the transmission and transceiver characteristics and then addresses that filter in the ROM. The digital signal from transmit filter 103-1 addresses ROM 420 via shift registers 405 and 410 so that it is responsive to the serial digital stream bit sequence information being transmitted. The filter output provides an additional memory address signal fed back from the filter output through shift register 415 as generally described in the aforementioned article. Adder 425 sums the output of the filter with the signals from ROM 420 and accumulator 430 stores the results. The output of accumulator 430 represents the near end echo signal derived from the digital information being transmitted. The filtering process is controlled by signals from control and calibration processor 230.

To obtain the best representation of the near end echo signal, filter selection is performed when the circuit of FIG. 1 starts operation prior to receipt of signal $s_a(t)$. Filter selector 401 initially addresses the first filter stored in ROM 420 and a digital signal is applied to shift register 405. The filter output is supplied to digital-to-analog converter 205 in FIG. 2. With signal $s_a(t)$ applied, analog-to-digital converter 220 provides an output corresponding to the output of filter 201. Digital adder 225 subtracts the digital signal from converter 220 from the m bit digital signal applied from filter 201 via calibration processor 230. The resulting signal is applied to filter selector 401 wherein the signal power is measured and stored. This process is repeated for the remaining filters stored in ROM 420 to select the filter that produces the minimum signal power. Upon completion of the filter selection, filter selector is set to address the filter that provides the minimum signal power for the transmission link to which the transceiver is connected. Different transmission links may require different filter selection. The filter selection operations may be repeated periodically.

The invention has been described with reference to illustrative embodiments thereof. It is apparent, however, that various modifications and changes may be made by one skilled in the art without departing from the spirit and scope of the invention.

I claim:

1. A communication system for exchanging digital signals over a transmission link comprising
    at least one terminal including
    means for supplying an input digital stream to the terminal,
    means for forming an analog signal corresponding to the input digital stream and for applying the analog signal to the transmission link, means for concurrently receiving an analog signal from the transmission link, said received analog signal including a predetermined component corresponding to the input digital stream to the terminal, and means responsive to the received analog signal for forming an output digital stream comprising means responsive to the input digital stream for generating an m<n bit digital signal corresponding to the predetermined component of the received analog signal, means for forming an analog signal representative of the difference between the received analog signal and the m<n bit digital signal corresponding to the predetermined component of the received analog signal, means for converting the difference representative analog signal to an n-m bit digital signal, and means for combining the predetermined component m bit digital signal with the n-m bit digital signal corresponding to the difference representative signal to produce an n bit digital signal representing the received analog signal.

2. A communication system for exchanging digital signals over a transmission link according to claim 1 wherein the means responsive to the input digital stream for generating an m<n bit digital signal corresponding to the predetermined component of the received analog signal comprises a digital filter for modifying signals in the digital stream to form the m bit digital signal representative of the predetermined component.

3. A communication system for exchanging digital signals over a transmission link according to claim 1 further comprising means for amplifying the difference representative signal and for applying the amplified difference representative signal to the means for converting the difference representative analog signal to an n-m bit digital signal.

4. A communication system for exchanging digital signals over a transmission link according to claim 1 wherein the combining means comprises means for summing the m<n digital signal corresponding to the predetermined component of the received analog signal and the n-m bit digital signal corresponding to the difference representative signal.

5. A communication system for exchanging digital signals over a transmission link according to claims 1,2,3 or 4 wherein the predetermined component is the near end echo component of the received analog signal.

6. In a communication system for exchanging digital signals over a transmission link having at least one terminal including means for converting an input digital stream to an analog signal and for applying the analog signal to the transmission link and means responsive to an analog signal received from the transmission link for forming an output digital stream, the received analog signal including a predetermined component corresponding to the input digital stream, the method of converting the received analog signal into an n bit digital signal representative thereof comprising the steps of:
generating an m<n bit digital signal corresponding to the predetermined component of the received analog signal responsive to the input digital stream,
forming an analog signal representative of the difference between the received analog signal and the m<n bit digital signal corresponding to the predetermined component of the received analog signal,
converting the difference representative analog signal to an n-m bit digital signal, and
combining the m<n bit digital signal corresponding to the predetermined component of the received analog signal with the n-m bit digital signal corresponding to the difference representative signal to produce an n bit digital signal representing the received analog signal.

7. In a communication system for exchanging digital signals over a transmission link having at least one terminal including means for converting an input digital stream to an analog signal and for applying the analog signal to the transmission link and means responsive to an analog signal received from the transmission link for forming an output digital stream, the received analog signal including a predetermined component corresponding to the input digital stream, the method of converting the received analog signal into an n bit digital signal representative thereof according to claim 6 wherein the step of generating an m<n bit digital signal corresponding to the predetermined component of the received analog signal comprises using a digital filter for modifying signals in the input digital stream to form the m bit digital signal representative of the predetermined component.

8. In a communication system for exchanging digital signals over a transmission link having at least one terminal including means for converting an input digital stream to an analog signal and for applying the analog signal to the transmission link and means responsive to an analog signal received from the transmission link for forming an output digital stream, the received analog signal including a predetermined component corresponding to the input digital stream, the method of converting the received analog signal into an n bit digital signal representative thereof according to claim 6 further comprising the step of amplifying the difference representative signal and applying the amplified difference representative signal to the means for converting the difference representative signal to an n-m bit digital signal.

9. In a communication system for exchanging digital signals over a transmission link having at least one terminal including means for converting an input digital stream to an analog signal and for applying the analog signal to the transmission link and means responsive to an analog signal received from the transmission link for forming an output digital stream, the received analog signal including a predetermined component corresponding to the input digital stream, the method of converting the received analog signal into an n bit digital signal representative thereof according to claim 8 wherein the combining step comprises summing the m<n bit digital signal corresponding to the predetermined component of the received analog signal and the n-m bit digital signal corresponding to the difference representative signal.

10. A communication system for exchanging digital signals over a transmission link according to claims 6,7,8 or 9 wherein the predetermined component is the near end echo component of the received analog signal.

* * * * *